United States Patent
Hu et al.

(10) Patent No.: US 8,089,879 B2
(45) Date of Patent: Jan. 3, 2012

(54) IN-BAND FLOW CONTROL METHODS FOR COMMUNICATIONS SYSTEMS

(75) Inventors: Teck H. Hu, Budd Lake, NJ (US); Gordon Peter Young, Bracknell (GB)

(73) Assignee: Alcatel Lucent, Paris (FR)

(*) Notice: Subject to any disclaimer, the term of this patent is extended or adjusted under 35 U.S.C. 154(b) by 1351 days.

(21) Appl. No.: 10/145,514

(22) Filed: May 15, 2002

(65) Prior Publication Data
US 2003/0214906 A1    Nov. 20, 2003

(51) Int. Cl.
*H04J 3/14* (2006.01)
(52) U.S. Cl. ........ 370/235; 370/229; 370/230; 370/231; 370/236
(58) Field of Classification Search .............. 370/230, 370/235, 229, 231, 236
See application file for complete search history.

(56) References Cited

U.S. PATENT DOCUMENTS

| | | | | |
|---|---|---|---|---|
| 6,160,808 A * | 12/2000 | Maurya | ............ | 370/389 |
| 6,229,789 B1 * | 5/2001 | Simpson et al. | ............ | 370/235 |
| 6,594,246 B1 * | 7/2003 | Jorgensen | ............ | 370/338 |
| 6,625,118 B1 * | 9/2003 | Hadi Salim et al. | ............ | 370/229 |
| 6,628,629 B1 * | 9/2003 | Jorgensen | ............ | 370/322 |
| 6,640,248 B1 * | 10/2003 | Jorgensen | ............ | 709/226 |
| 6,643,813 B1 * | 11/2003 | Johansson et al. | ............ | 714/748 |
| 6,721,273 B1 * | 4/2004 | Lyon | ............ | 370/235 |
| 6,757,245 B1 * | 6/2004 | Kuusinen et al. | ............ | 370/230 |
| 6,795,435 B1 * | 9/2004 | Jouppi et al. | ............ | 370/394 |
| 6,862,622 B2 * | 3/2005 | Jorgensen | ............ | 709/226 |
| 6,901,063 B2 * | 5/2005 | Vayanos et al. | ............ | 370/335 |
| 7,013,419 B2 * | 3/2006 | Kagan et al. | ............ | 714/749 |
| 7,062,568 B1 * | 6/2006 | Senevirathne et al. | ............ | 709/234 |
| 7,142,509 B1 * | 11/2006 | Rovner et al. | ............ | 370/230 |
| 7,385,962 B1 * | 6/2008 | Valo et al. | ............ | 370/347 |
| 7,539,134 B1 * | 5/2009 | Bowes | ............ | 370/230 |
| 2003/0088667 A1 * | 5/2003 | Riedle | ............ | 709/224 |
| 2004/0203973 A1 * | 10/2004 | Khan | ............ | 455/517 |

FOREIGN PATENT DOCUMENTS

| | | |
|---|---|---|
| JP | 8-251226 | 9/1996 |
| JP | 2000-341326 | 12/2000 |
| WO | WO 00/35225 | 6/2000 |

OTHER PUBLICATIONS

"High Speed Downlink Package Access" 3GPP TS 25.308 V5.2.0 (2003-03), Mar. 3, 2002.
"Stall Avoidance with In-Band Signalling" 3GPP TSG-RAN WG2#25, Nov. 26-30, 2001.
"NodeB-UE Flow Control in HSDPA", 3GPP TSG-RAN WG2#28, Kobe, Japan, Apr. 8-12, 2002, 5 pages.
Japanese Office Action dated Apr. 9, 2008 for counterpart Japanese Patent Application No. 2003-137622.
Office Action for corresponding Japanese Application No. 2003-137622 date Feb. 12, 2009.

* cited by examiner

*Primary Examiner* — Daniel J Ryman
*Assistant Examiner* — Jay P Patel
(74) *Attorney, Agent, or Firm* — Harness, Dickey & Pierce

(57) ABSTRACT

In the method, a source device places identifiers in data packets to be transmitted. The identifiers may include in-band flow control acknowledgment data in response to a flow control request transmitted from a destination device. When the destination device receives the transmitted data packets, the destination device will proceed based on the data contained in the data packets that are to be decoded at the destination device. If the decoded data packet contains in-band flow control acknowledgment data in response to a flow control request from the destination device, the destination device processes the data packets based on the received in-band flow control acknowledgment data.

3 Claims, 6 Drawing Sheets

IN-BAND FLOW CONTROL METHODS FOR COMMUNICATIONS SYSTEMS

BACKGROUND OF THE INVENTION

1. Field of the Invention

The present invention relates to next generation wireless communication systems; and more particularly, to methods for flow control in channels of these systems.

2. Description of Related Art

In telecommunications systems, particularly in the well-known High Speed Downlink Packet Access (HSDPA) specification in the Universal Mobile Telecommunication System (UMTS) standard, for example, a transport channel such as a High Speed Downlink Shared Channel (HS-DSCH) is used for transmissions from a source device (e.g., Node-B or base station) to one or more destination devices (e.g., mobile stations or user equipment (UE)).

Typically, flow control in wireless communications systems is necessary in order to regulate a transmission over the transport channel from the source device to the destination device (e.g., from UE to Node-B). Flow control techniques should account for the receiving capability of the destination device, so that queuing at the destination device is managed so as to avoid congestion and packet loss at the destination device. With flow control, both the transport latency and signaling latency is reduced, since retransmissions due to discarded packets as a result of congestion or buffer overflow at the destination device is reduced or avoided.

In HSDPA, downlink flow of data to the UE needs to be regulated for similar reasons, i.e. to avoid the congestion and overflowing of the buffer at the UE. The problem is more serious in HSDPA due to a fast channel dependent scheduling nature that is present at the Node-B.

In HSDPA, in order to improve efficiency, the scheduling function has been relocated from a Radio Network Controller (RNC, a central, fixed controller at the UMTS core for example that is responsible for managing system radio resources) to the base station or Node B in order to provide "fast" scheduling based on channel quality feedback from the UEs. Moreover, technologies such as adaptive modulation and coding (AMC) and hybrid automated repeat request (HARQ) have been introduced to improve overall system efficiency and capacity by providing higher data rates and greater transmission robustness. In general, a scheduler selects a UE for transmission at a given time, and adaptive modulation and coding allows selection of the appropriate transport format (modulation and coding) for the current channel conditions seen by the UE.

In HSDPA, for example, the scheduler, AMC and HARQ functions are provided by a MAC-hs (medium access control-high speed) controller located in a base station. The MAC-hs is responsible for handling the data transmitted on the air interface. Furthermore the MAC-hs has responsibility to manage the radio link physical resources allocated to HSDPA. In general, the functions carried out by MAC-hs include scheduling/priority handling, Hybrid ARQ, and a physical layer transport format, e.g., modulation, coding scheme, etc. The flow control entity would also reside in the MAC, for HSDPA in the MAC-hs.

Thus, in a fast channel dependent scheduling scheme, large amounts of data may be sent to the UE when the UE channel condition is very good. Accordingly, flow control mechanisms or techniques should be able to inform a Node-B as to the current buffer status, or the receiving capability at the UE, in order to avoid overflow or congestion conditions at the receiver buffer in the UE.

The following illustrates an example where an overflow condition could occur. A UE may be used as a personal gateway, e.g., where the UE is used to connect to other devices such as laptop, personal display assistant (PDA), etc., through a BLUETOOTH wireless protocol, for example, which allows users to make effortless, wireless and instant connections between various external communication devices, such as mobile phones and desktop and notebook computers. The radio link between the UE and the connected external device could be temporarily reduced, since bit rate is lowered as interference increases. As a result, the data enroute to the external device is held up at the UE. To control the buffer overflow at the UE, the present link setup between a Radio Resource Controller (RRC) at the Node-B and the UE has to be reconfigured. Before such a reconfiguration can take place, the Node-B will already have scheduled additional data to the UE. The UE will have no choice but drop the packets meant for the destination device once the buffer at the UE is full. Since packets have already been correctly transmitted by the HARQ, any retransmission incurs additional delay, thereby wasting radio resources as well.

Flow control techniques must be able to avoid these overflow conditions. Equally important, flow control must be able to perform selective flow control on the multiple flows originating from the source device. More than one "flow" or application can be multiplexed in the downlink transmission to the UE. These flows could be of different priority levels or classes from different or same applications. Up to a maximum of eight priorities classes are supported in HSDPA. Thus, if there is more than one data flow existing for the UE, and buffer occupancy is critical for only one of the flows, flow control that is able to differentiate between these different flows is important in order to maximize system throughput.

Presently, flow control mechanisms employing an out-of-band signaling solution have been proposed for UE flow control for both uplink signaling and downlink signaling. In general, out-of-band signaling sends the control messages in the control channel or channels. Out-of-band signaling carries physical layer, or layer 1-generated messages. These messages, without additional signaling defined therein, are essentially blind to the contents of the data payload.

Flow control mechanisms using in-band signaling could be embodied in the following possible combinations: (1) Out-of-band Uplink and Downlink Signaling; (2) Out-of-band Uplink and In-band Downlink Signaling; and (3) In-band Uplink, and In-band/Out-of-band Downlink Signaling.

In general, uplink signaling consists of transmitting UE feedback to the Node-B request for a reduction of flow rate, for termination of flow, or for the postponement or hold from the Node-B, or the restart of flow from the Node-B to the UE. A UE would send such a request before its application buffer is full to avoid dropping any packet caused by buffer overflow. The Node-B will reduce, terminate or hold the data flow to the UE for a predefined time, or until the Node-B receives a restart flow request from the UE.

In addition to the uplink UE flow control request signaling from the UE, out-of-band downlink signaling from the Node-B carrying the acknowledgment message of the flow control request by the UE can be employed in the downlink to increase the reliability of the flow control mechanism. Errors in the uplink UE requests for flow control may lead to unrecoverable error cases. In HSDPA, where enhancement to the air interface capability is only in the downlink, the uplink is relatively more error prone since no HARQ process and AMC are implemented. The UE can use a higher power on the uplink request. However, it may not be possible to increase the power due to system UE power limitations. Moreover, higher transmit power from the UE will generate more interference, thus affecting the overall uplink capacity for the system.

In the uplink UE request for flow control, either in-band or out-of-band signaling could conceivably be employed. However, presently in HSDPA, where no new uplink transport channel has been proposed, the choice of signaling method is restricted to only the above-described out-of-band signaling method.

Further, in the downlink, there are several disadvantages with using the aforementioned out-of-band flow control methods for UE flow control: (a) flow control for the different flows cannot be provided since knowledge of the data payload types is not available at the layer 1 or the physical layer. Hence, flow control has to be performed for all the flows sent to the UE; (b) out-of-band signaling requires protection through more complex coding and/or modulation schemes that requires higher power requirements. These complex schemes consume precious air interface resources that otherwise could be used for other functions; and (c) in HSDPA, the out-of-band signaling does not gain from the HARQ retransmissions process that, among many of its advantages, also provides robustness at high Doppler and provides a Turbo Coding gain that is not employed by out-of-band signaling techniques. Accordingly, flow control mechanisms or techniques that do not distinguish between the different priority flows must simultaneously control each of the different priority flows to the UE.

SUMMARY OF THE INVENTION

The present invention provides transmission and reception methods and apparatuses where a source device places identifiers in data packets being transmitted. The identifiers may include in-band flow control acknowledgment data in response to a flow control request transmitted from a destination device. When the destination device receives the transmitted data packets, the destination device will proceed based on the data contained in the data packets to be decoded at the destination device. If the decoded data packet contains in-band flow control acknowledgment data in response to a flow control request from the destination device, the destination device proceeds based on the received in-band flow control acknowledgment data.

In an embodiment describing a method of transmitting data packets, a flow control acknowledgment for a destination device is inserted in a non-payload portion of a data packet; and the data packet is transmitted to the destination device with the flow control acknowledgment. The flow control acknowledgment is transmitted in response to a flow control request from the destination device.

In an embodiment describing a method of receiving the transmitted data packets, the destination device receives the data packet with the portion containing the flow control acknowledgment for the destination device therein, stores the received data packets in at least one buffer; and decodes the data packets to process the data packets based on the received flow control acknowledgment data.

DETAILED DESCRIPTION

Although the principles of the invention are particularly well-suited for wireless communications systems based on the well-known High Speed Downlink Packet Access (HSDPA) specification in the Universal Mobile Telecommunication System (UMTS) standard, and will be described in this exemplary context, it should be noted that the embodiments shown and described herein are meant to be illustrative only and not limiting in any way. As such, various modifications will be apparent to those skilled in the art for application to other transmission systems and are contemplated by the teachings herein. Additionally where used below, user equipment (UE) is synonymous to a mobile station in a wireless network, and base station and Node-B may be used interchangeably. In this disclosure, the phrases "different flows" and "different priority classes" are used interchangeably.

In accordance with the invention, an in-band flow control technique in the downlink utilizes a header of a MAC-hs PDU packet to send flow control acknowledgment messages to respond to the UE's flow control request. In addition, the in-band control acknowledgement messages (ACK) contained in the MAC-hs PDU permits flow control to be activated for the same flow or priority class that the current flow control ACK is currently being sent in (i.e, the MAC-hs payload contains data of the same flow that requires flow control); and permits flow control to be activated for a different flow from the current flow, where the flow control ACK is currently being sent in. Both methods are achievable since the flow control ACK message is associated with the flow identification, or the priority class of the flow. Thus, in-band signaling for flow control in the downlink allows flow control of different flows to be communicated to the UE rapidly, without having to wait for data of a specific flow for the flow control ACK message to be sent.

The advantages of in-band downlink signaling for flow control are several. Firstly, in-band signaling for flow control in the downlink allows the Node-B to selectively control the flows to the UE, so that individual flows to one device may be suspended or reduced while allowing other flows to continue. The decision of selective control may be based on many requirements such as delay, quality of service etc. Second, in-band signaling benefits from the robustness of the HARQ operation as well as the Turbo coding gain that exists in the downlink transport channel such as the HS-DSCH transport channel for HSDPA for UMTS Finally, acknowledgment in the downlink provides reliable two-way communications for handling flow control requests from the UE.

Figure 1:
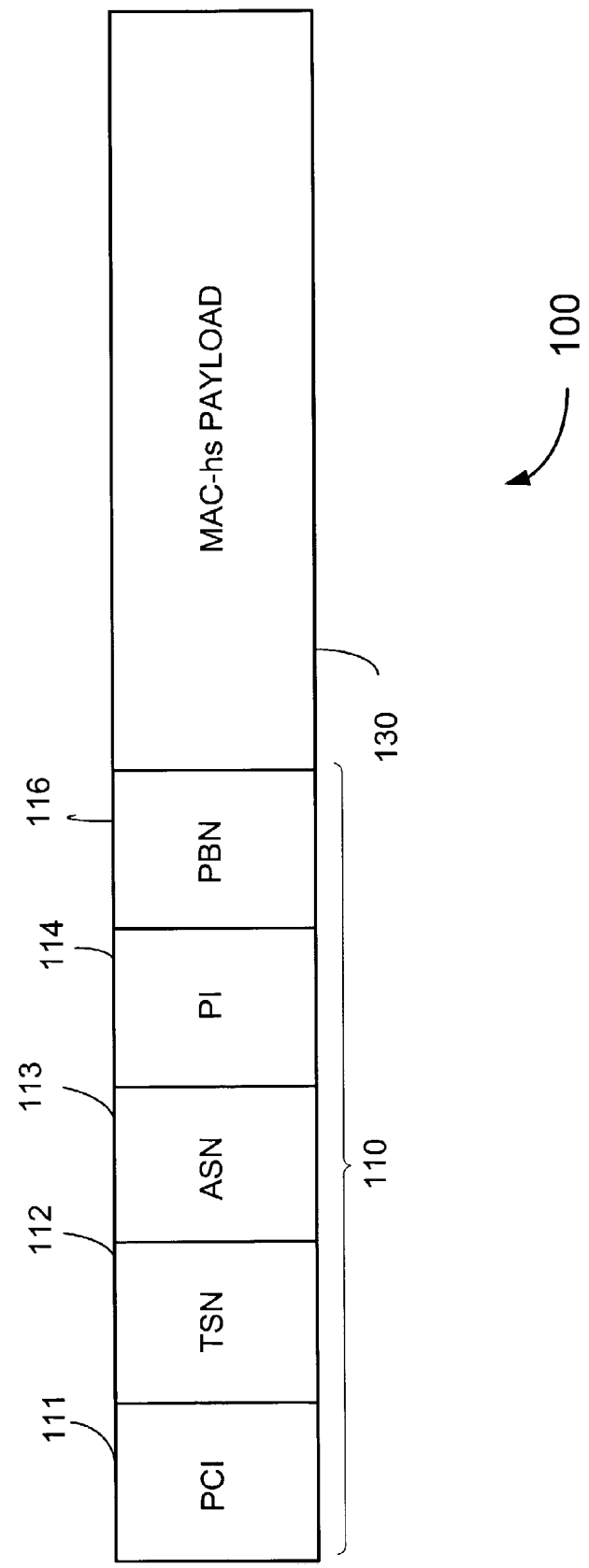
FIG. 1 illustrates a structure of a data packet in accordance with the present invention.

FIG. 1 illustrates a structure of a data packet in accordance with the flow control methodology of the present invention. As seen in FIG. 1, there is a MAC-hs PDU packet structure of a data packet 100 that may be transmitted over a HS-DSCH, for example, between a base station and a UE. MAC-hs PDU is the equivalent of the MAC PDU that is packet that is being sent from the MAC to the physical layer. Is consists of the payload that the MAC receives, in this case the MAC-hs payload, and some headers that are appended in the MAC layer. In one embodiment, the packet structure 100 may include a header portion 110 and MAC-hs payload 130. Header portion 110 includes a priority class indicator (PCI) 111 that indicates the priority of the particular payload in the data packet, an in-band transmission sequence number (TSN) 112 indicating the data packet's sequence in a transmission, an acknowledgement sequence number (ASN) 113 to be described further below, a padding indicator (PI) 114 which indicates that MAC-hs payload 130 has been padded to make the MAC-hs PDU up to a specific packet size and a padding block number (PBN) 116 indicating the number of coding bits, or size of the padding added thereto. The MAC-hs payload 130 contains control and traffic data received from the upper layers.

In accordance with an embodiment, the method provides in-band signaling for flow control in the downlink. This is done by utilizing additional available space in the TSN 112 of the header 110 in order to insert in-band flow control acknowledgment data for acknowledging a UE's flow control request, which is to be transmitted in the data packet over an HS-DSCH, for example, to a UE. The flow control acknowledgement to the UE's request tells the UE what to do so as not to become overloaded. As an example, the acknowledgment may contain messages to terminate a particular flow, hold up a particular flow, simply acknowledge a request to reduce the rate for a particular flow or to restart a particular flow. Providing the flow control acknowledgment in-band, where the payload of each data packet is indicated by priority, ensures that the in-band flow control acknowledgment data is per priority. This enables the base station to control the flow of various priorities of transmitted data packets in the downlink.

In this embodiment, providing in-band flow control in the downlink is possible due to the current size of the TSN in the HSPDA standard (6 bits), which provides sufficient space ($2^6$ or 64 possible values) for inclusion of both the TSN and the in-band flow control acknowledgement.

In another embodiment, instead of allocating space in TSN 112 for insertion of the in-band flow control acknowledgment, the ASN 113 is utilized for acknowledging the UE's flow control request, in addition to performing other functions. This is possible since the ASN 113 contains sufficient space, depending on the field size allocated for the ASN. For an ASN of 5 bits, 32 possible values for the ASN are available. Thus, 1-4 of these values, could be used to acknowledge the various flow control requests from the UE.

Figure 2:
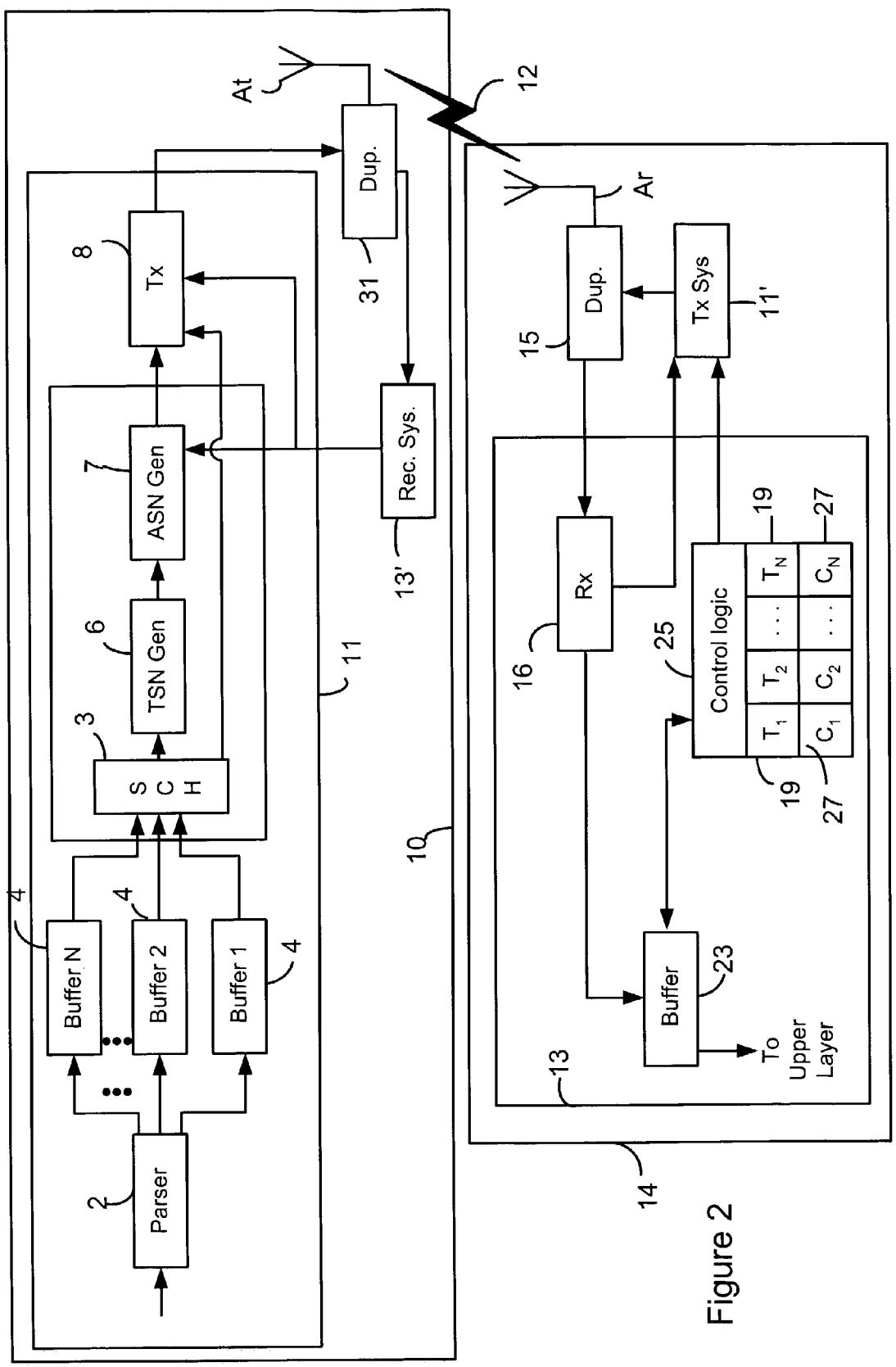
FIG. 2 illustrates a logical block diagram of a transmit and receive system according to an embodiment of the present invention.

FIG. 2 illustrates a logical block diagram of a transmit and receive system employing the flow control methodology of the present invention. Particularly, FIG. 2 is provided to describe the general processing and data flow of a data packet in the downlink from a base station to a UE. This transmit-and-receive system has been proposed for HSDPA and includes data packets provided with an in-band transmission sequence number (TSN) and an acknowledgement sequence number (ASN), as described in co-pending U.S. patent application Ser. No. 09/994,490, filed Nov. 26, 2001 by Hu et al. and entitled "METHOD AND APPARATUS FOR TRANSMITTING AND RECEIVING DATA PACKETS TO AVOID STALL DURING RE-SEQUENCING OF DATA PACKETS", which is hereby incorporated by reference in its entirety.

As shown in FIG. 2, a source device (e.g., a base station or Node-B) 10 transmits data packets over a medium 12 to a destination device (e.g., user equipment (UE)) 14. Hereinafter, the source device 10 will be referred to as base station 10 and the destination device 14 will be referred to as the UE 14, but it will be understood that the UE could be the source device and the base station the destination device.

The base station 10 includes a parser 2 that receives data packets for transmission from other base station circuitry, not shown for the sake of brevity and clarity. The data packets originate from one or more logical channels, and have been assigned a priority class. As discussed above, each data packet includes a PCI 111 indicating the priority class (1 through N) of the data packet. As described in FIG. 1, the PCI 111 may be included in a header portion of the data packet.

The parser 2 parses the data packets into one of N buffers 4 based on the PCI 111 of the data packet. A buffer 4 is provided for, and associated with, a different one of the N priority classes; hence, N buffers 4 are provided. For example, the parser 2 outputs data packets 100 having a PCI of 1 to the buffer 4 associated with priority class 1, outputs data packets 100 having a PCI of 2 to the buffer 4 having a priority class of 2, etc.

A scheduler 9 receives the data packets from the buffers 4, and schedules the data packets 100 for transmission by a transmitter 8. Specifically, a scheduling unit 3 receives the data packets 100 based on their priority class, and orders the data packets for transmission. Data packets having a higher priority class will be scheduled for transmission prior to data packets of a lower class, and data packets having a higher priority class may pre-empt the transmission of data packets having a lower priority class. If a data packet 100 having a higher priority class than the data packet currently undergoing transmission/re-transmission is received by the scheduling unit 3, the scheduling unit 3 may instructs the transmitter 8 to abort transmission of the lower priority class data packet. The scheduling unit 3 also notifies an ASN generator 7 (discussed in detail below) of the aborted data packet.

A transmission sequence number (TSN) generator 6 receives the data packets for transmission from the scheduling unit 3 and assigns each data packet a transmission sequence number. The TSN generator 6 keeps track of a transmission sequence for each priority class accordingly, there are 1 transmission sequence number for every priority class. The TSN generator 6 assigns the next TSN in the transmission sequence for the priority class to which a received data packet belongs. Specifically, the TSN is disposed in a predetermined position in the data packet. As described in FIG. 1, the TSN may form part of header portion of the data packet.

After assigning a TSN to a data packet, the TSN generator 6 increments the TSN, and this new TSN will be assigned to the next, received data packet of that priority class. In a preferred embodiment, the TSN generator 6 begins by assigning a TSN of, for example, 0, and increments the TSN by 1.

Because a different transmission sequence is associated with each priority class, the data packets of a particular priority class have TSNs that are independent of the TSNs assigned to data packets of other priority classes. As a result, two data packets of different priority classes can have the same TSN.

An acknowledge sequence generator 7 generates an acknowledge sequence number (ASN) based on information from a receiving system 13', and inserts the generated ASN into a predetermined position in the data packet. For example, as shown in FIG. 1, the ASN may form part of the header portion for the data packet. When the source device receives an acknowledgment that the destination device has received a data packet, the source device inserts an acknowledge sequence number in a data packet for transmission. The acknowledge sequence number is the same as the transmission sequence number of the acknowledged data packet. On the receive side, the destination device will treat a missing data packet having the same transmission sequence number as the acknowledge sequence number as having been output to the next, upper layer of processing; namely, confirmation that the missing data packet is lost. And, because the missing data packet is flushed, any stall in the delivery of correctly received data packets to the higher layers is avoided.

Furthermore, when the transmission of a data packet is aborted, the source device inserts an acknowledge sequence number in a data packet for transmission. The acknowledge sequence number is the same as the transmission sequence number of the aborted data packet. Consequently, on the receive side, the destination device will treat the missing, aborted data packet having the same transmission sequence number as the acknowledge sequence number as having been output to the next, upper layer of processing. Because the missing, aborted data packet is flushed, again a stall situation is avoided.

The receiving system 13' has the same structure as the receiving system 13 in the UE 14, and will, therefore, not be described in detail as the receiving system 13 is described in detail below. Briefly, however, the receiving system 13' differs in that it notifies the ASN generator 7 of the TSN and PCI for data packets that have been acknowledged by the user equipment 14 as properly received.

The ASN generator 7 generates an ASN equal to the TSN of the acknowledged data packet, and stores the generated ASN by the priority class of the acknowledged data packet. The ASN generator 7 also generates an ASN equal to the TSN of the data packet aborted by the scheduling unit 3. Specifically, the scheduling unit 3 identifies the data packet to be aborted by its TSN and PCI, the ASN generator 7 generates the ASN equal to the TSN of the aborted data packet, and stores the generated ASN with the other ASNs having the same priority class as the aborted data packet. The ASN generator 7 receives a data packet for transmission from the TSN generator 6, and identifies its priority class from its PCI. The ASN generator 7 then looks up the stored ASNs having that priority class, and inserts, for example, in one embodiment, the latest or most current stored ASN in the data packet. In this manner, the ASNs are inserted into the header portions 110 of the data packets 100 on a last-in, first-out basis.

A transmitter 8 receives the data packets from the scheduler 9, and multiplexes the data packets into a transport channel, such as a HS-DSCH, for transmission via a duplexer 31 and one or more antennas At over medium 12. For data packets that the receiving system 13' identifies as not being properly received by the UE 14, the transmitter 8 retransmits those data packets. Additionally, the transmitter 8 expects to receive confirmation that a data packet has been received at a predetermined period of time after transmission. If no such confirmation is received, then the transmitter 8 retransmits the data packet. And, after a data packet has been retransmitted a predetermined number of times, the transmitter 8 discard the data packet without attempting any further retransmissions.

At the UE 14, the data packets are received by a receiving system 13 via one or more receive antennas Ar and a duplexer 15. A receiver 16 decodes the data packets, and outputs the data packets to a single buffer 23, which stores the data packets. In a preferred embodiment, the buffer 23 is a random access memory. When the receiver 16 sends the data packets to the buffer 23, the receiver 16 instructs the transmission system 11' to output an acknowledge response for the received data packet. The acknowledge response identifies the received data packet by its PCI and TSN and indicates that the data packet has been received. However, if the receiver 16 is unable to receive the data packet (e.g., cannot decode the data packet), the receiver 16 instructs the transmission system 11' to send a non-acknowledge response for the data packet. The non-acknowledge response in this embodiment indicates that the data packet has not been correctly received, and due to fore mentioned associated timing between the transmission and the reception of the acknowledge indicator at the transmitter, the transmitter is able to identify the received data packet by its PCI and TSN. The transmission system 11' may have the same structure as the transmission system 11 in the base station 10 described in detail above.

Control logic 25 in the UE 14 causes the buffer 23 to output data packets to the next, upper layer of processing based on the PCI and TSN of the data packets. Specifically, the control logic 25 includes a counter 27 associated with each priority class. Accordingly, there are N counters 27, one for each priority class. The counter 27 is set to the next expected in-sequence value of the TSN in the received packet data. After the buffer 23 has been loaded with a number of data packets, the control logic 25 examines the TSNs of the data packets for priority class 1 and compares the counter 27 for that priority class to a value equal to the lowest TSN of the received data packets. If the received data packet has a TSN equal to the count value of the counter 27 for that priority class, the counter 27 is incremented. In this manner, even though data packets are received out-of-sequence by the user equipment 14, the data packets are sent to the next, upper layer of system processing in-sequence. This process is then repeated for other data packets having the same priority class and in turn repeated for each priority class.

Furthermore, the same comparison, output and increment process is performed for data packets in the other priority classes using their associated counters 27. The count down timer 19 is started when a data packet having a TSN greater than the count value of the counter 27 is received. The control logic 25 initializes a count down timer (e.g., 10 seconds) 19 associated with the counter 27 when either the counter is reset, or all the packet data with TSN values between the count value of the counter 27 and the packet data with the value SN, are received, or the timer expires. Where SN is the TSN value of the packet data received for which the timer is started. If the count down timer 19 expires before the buffer 23 receives a data packet having a TSN equal to the count value of the counter 27 for that priority class, the counter 27 is incremented. In this manner, even though data packets are received out of order by the user equipment 14, the data packets are sent to the next, upper layer of system processing in sequence.

The control logic 25 further monitors any ASNs in the received data packets. If the counter 27 for a priority class has the same count value as the ASN in a received data packet belonging to that priority class and a data packet in that priority class having a TSN equal to the ASN is not present in the buffer (e.g., is missing), the control logic 25 will treat the data packet having that priority class and a TSN equal to the ASN as having been output to the next, upper processing layer. Namely, the control logic 25 will increment the counter 27 associated with that priority class. This effectively flushes that data packet.

The overall structure having been described, a flow control method in accordance with one embodiment is now described with reference to the flow diagram of FIG. 3, where the header for a MAC-hs PDU is appended. Initially, scheduler 9 assigns a TSN (Step S30) to UE 14; this may be done by a suitable algorithm in scheduler 9. The scheduler 9 then checks if any flow control request for a particular flow has been received from the UE 14 (Step S31). If a flow control request has been received (YES at Step S31), TSN generator 6 will replace the TSN assigned to UE 14 in Step S30 with the flow control ACK message through a pre-allocated TSN number (Step S32) for flow control in TSN 112 of the header 110, and ASN generator 7 then proceeds to generate an ASN number (Step S34). A single location or space in TSN 112 is assumed to be allocated for the in-band flow control acknowledgment (ACK) message. For this embodiment, the flow control request is for the same data that is being sent in the current MAC-hs PDU packet over an HS-DSCH to UE 14.

If, after assigning a TSN, it is determined that UE 14 has not sent a flow control request (NO at Step S31), the TSN generator 6 increments the current TSN value (Step S34) and this new TSN will be assigned to the next, received data packet of that priority class. In a preferred embodiment, the TSN generator 6 begins by assigning a TSN of, for example, 0, and increments the TSN by 1, as discussed above regarding FIG. 2.

In a variation of this first flow control embodiment, the flow control request from the UE 14 may be for a flow or data flow priority that has no data to send. In order to send a flow control command to the UE 14, the PCI field is then set to the value equal to the PCI for the flow requested by the UE 14. A MAC-hs PDU of zero payload with PCI set to the PCI flow requested can then be sent to the UE with the TSN value indicating termination of flow for the flow identified by the PCI value.

Similar to that described in FIG. 2, ASN generator 7 generates an ASN (Step S34) based on information from a receiving system 13', and inserts (Step S35) the generated ASN into the header portion of the data packet. Transmitter 8 receives the data packets with PCI, the TSN 112 containing a valid transmission sequence number only, or containing the flow control ACK message through a pre-allocated spacer (Step S32) for flow control in TSN 112 of the header 110, and the generated ASN 113 from the scheduler 9, and multiplexes (Step S36) the data packets into a transport channel, such as a HS-DSCH, for transmission (Step S37) via a duplexer 31 and one or more antennas At over medium 12.

Figure 3:
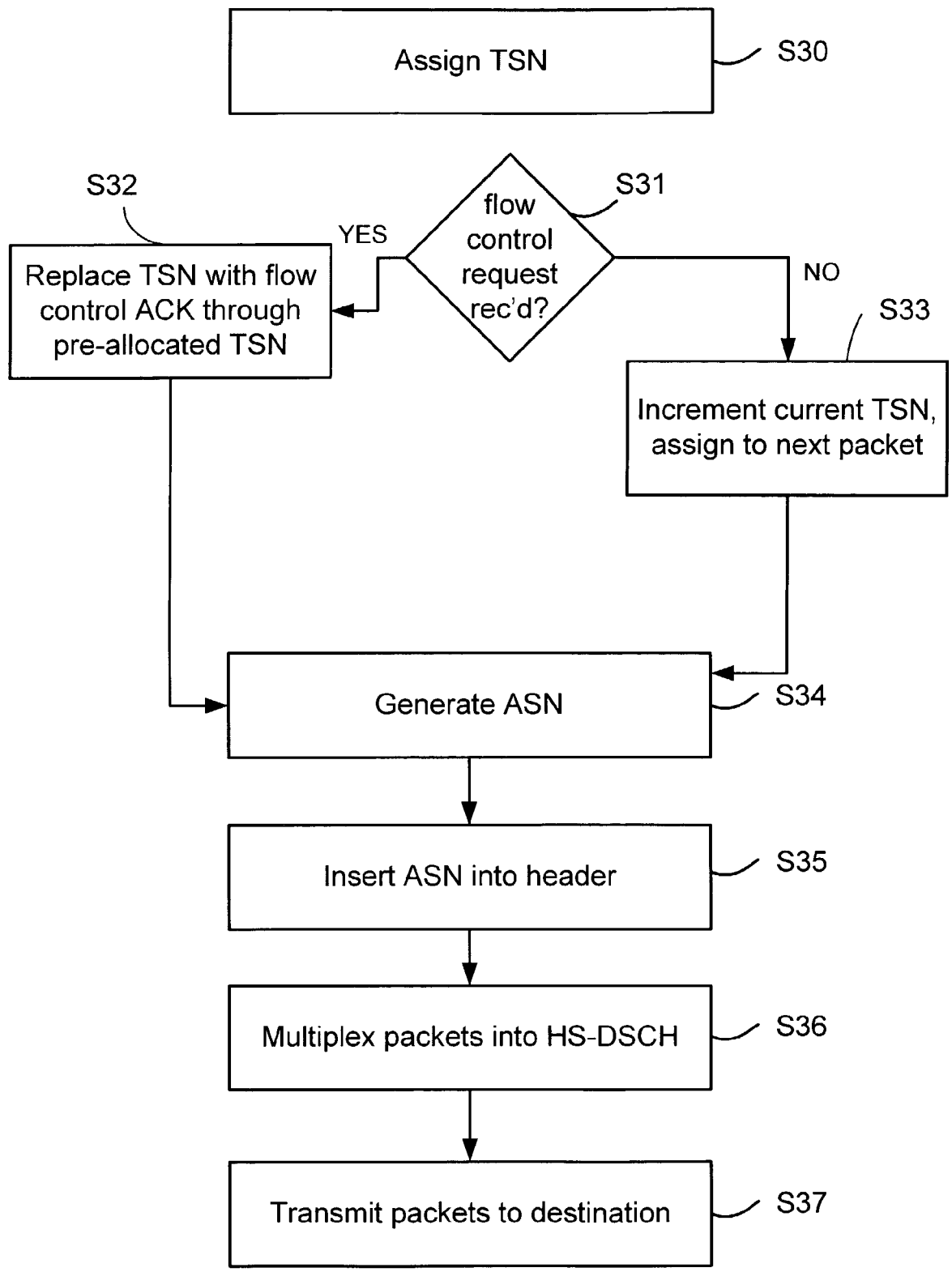
FIG. 3 illustrates an embodiment of the method in accordance with the invention.
Figure 4:
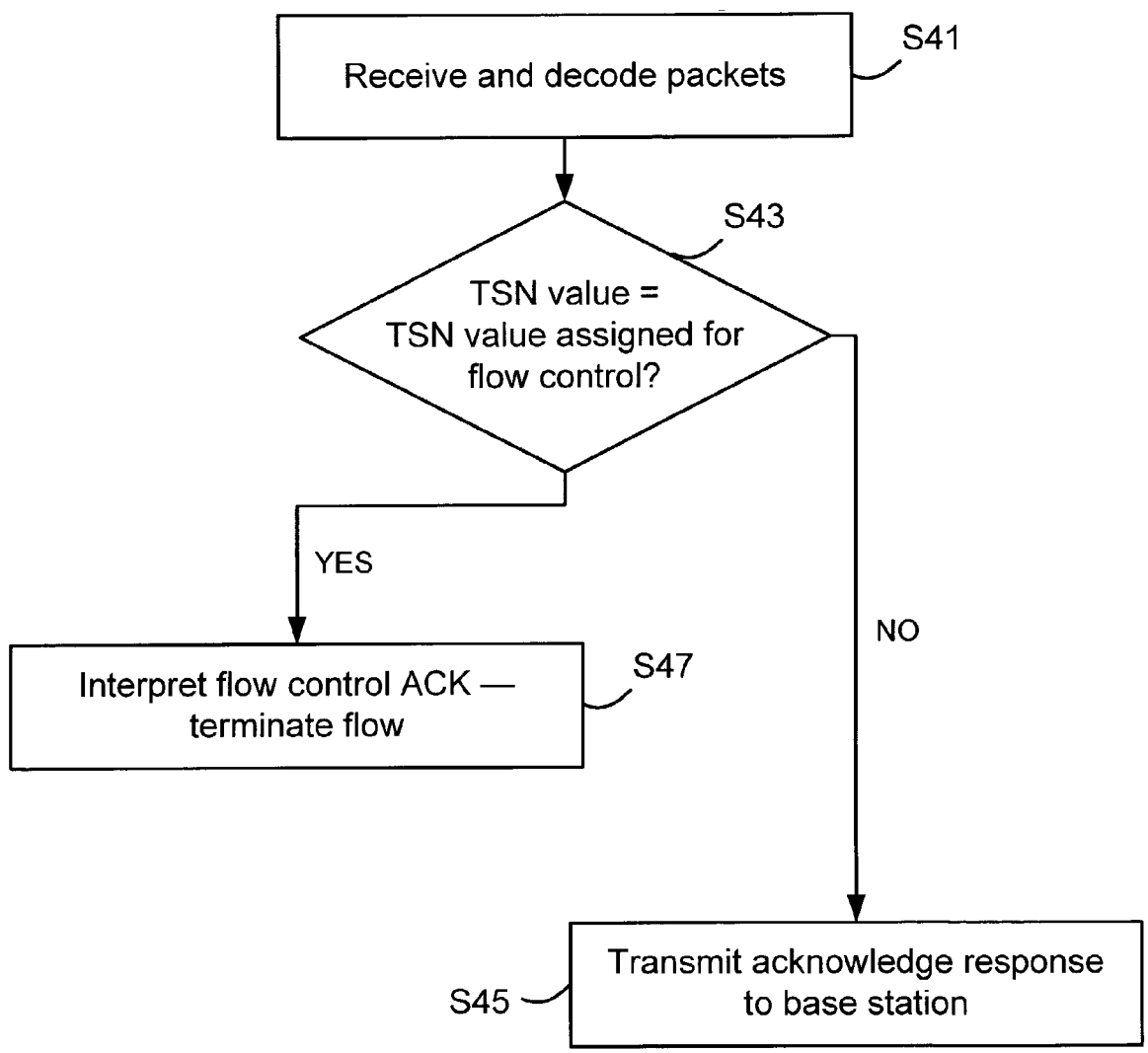
FIG. 4 illustrates the receiver-side functions based on the embodiment of FIG. 3.

FIG. 4 illustrates the receiving side functions in accordance with the embodiment of FIG. 3. At the UE 14, the data packet is received and a receiver 16 decodes (Step S41) the MAC-hs PDU data packet, and outputs the data packet to a single buffer 23, which stores the data packet. Similar to FIG. 2, when the receiver 16 sends the data packets to the buffer 23, the receiver 16 instructs the transmission system 11' to output an acknowledge response for the received data packet.

Specifically, the UE 14, upon receiving the MAC-hs PDU (e.g., data packet), de-assembles the MAC-hs PDU (e.g., decoding of Step S41) to obtain the TSN value from the TSN field. The UE 14 then determines whether or not the decoded TSN (Step S43) is a valid TSN with no flow control request therein, or a TSN value that has been assigned for flow control signaling to UE 14. If the TSN value is a valid transmission sequence number (NO at Step S43), the transmission system 11' transmits an acknowledge response to the base station 10 that identifies the received data packet by its PCI and TSN and indicates (Step S45) that the data packet has been received. If the TSN value is equal to the TSN value assigned for flow control (YES at Step S43), the UE 14 will interpret the TSN as a message that the flow indicated by the PCI will be controlled as requested by the UE in its flow control request. The flow is then terminated (Step S47) in this example.

Figure 5:
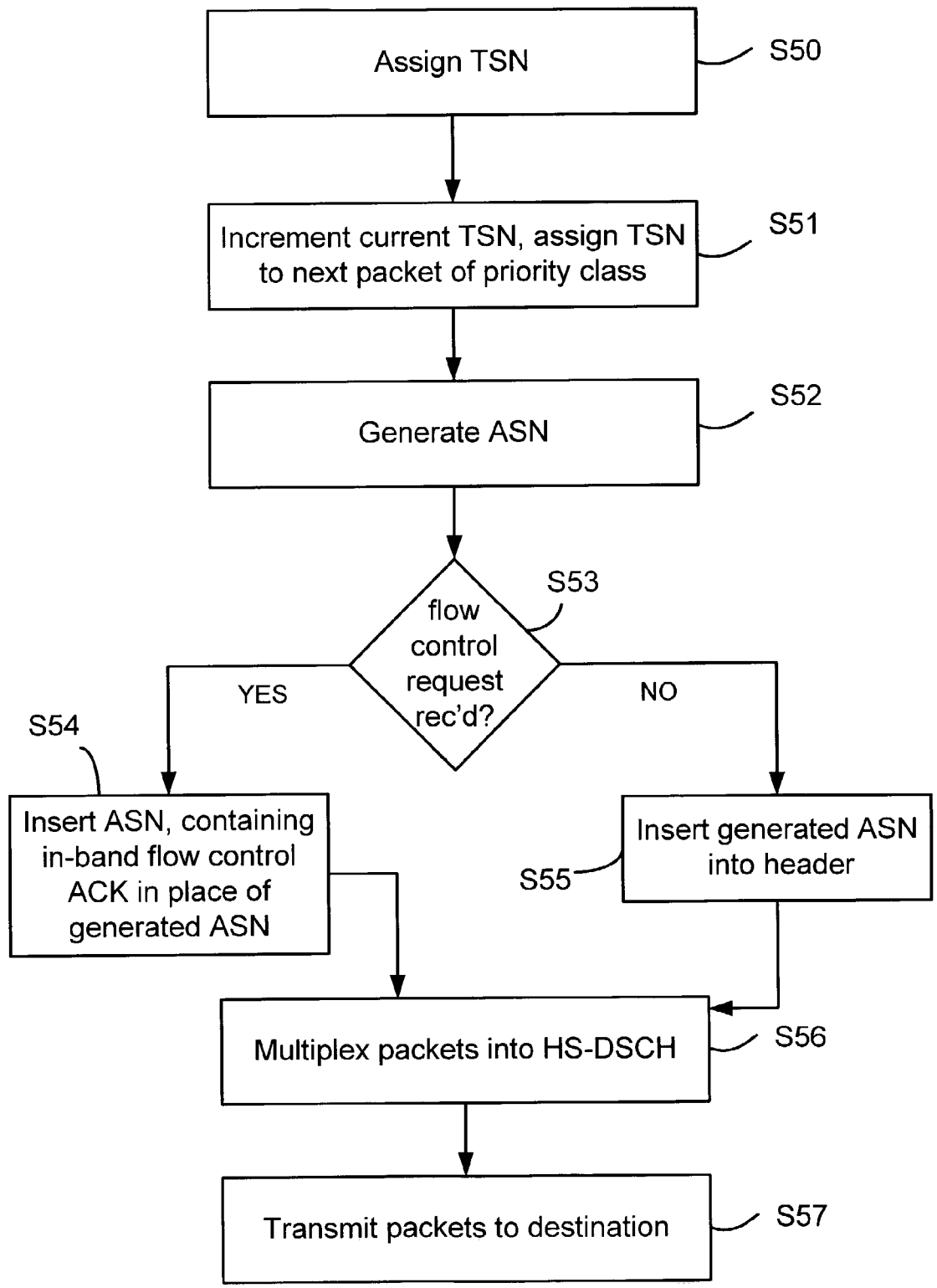
FIG. 5 illustrates another embodiment of the method in accordance with the invention.

FIG. 5 illustrates another embodiment of the method in accordance with the invention. FIG. 5 is somewhat similar to FIG. 3, with the exception that the ASN is used for generating the in-band flow control acknowledgment data instead of allocating space in the TSN of the header for insertion of the in-band signaling acknowledgment data for flow control.

TSN generator 6 receives the data packets for transmission from the scheduling unit 3 and assigns (Step S50) each data packet a transmission sequence number. The TSN generator 6 assigns the next TSN in the transmission sequence, (Step S51) incrementing the TSN so a new TSN is assigned to the next, received data packet of that priority class.

Similar to that described in FIG. 2, ASN generator 7 generates an ASN (Step S52) based on information from a receiving system 13'. However, if a flow control request has been received in the uplink from the UE (YES in Step S53), the ASN generator 7 will replace the ASN assigned in Step S52 with the flow control ACK message through a pre-allocated ASN number (Step S54) for flow control in the ASN 113. In this embodiment, a single location in the ASN space is assumed to be allocated for the in-band flow control acknowledgment message, although one or more spaces could be allocated for the in-band flow control acknowledgment message. If no flow control request was received (NO at Step S53), the generated ASN is inserted (Step S55).

Transmitter 8 receives the data packets with PCI, TSN, and ASN with either valid acknowledgment sequence number or in-band flow acknowledgment data from the scheduler 9, and multiplexes (Step S56) the data packets into a transport channel, such as a HS-DSCH, for transmission (Step S57) via a duplexer 31 and one or more antennas At over medium 12.

In a variation of this second flow control embodiment, the flow control request from the UE 14 may be for a flow or data flow priority that has no data to send. In order to send a flow control command to the UE, the PCI field is then set to the value equal to the PCI for the flow requested by the UE. A MAC-hs PDU of zero payload can then be sent to the UE with the ASN value indicating termination of flow for the flow identified by the PCI value.

Figure 6:
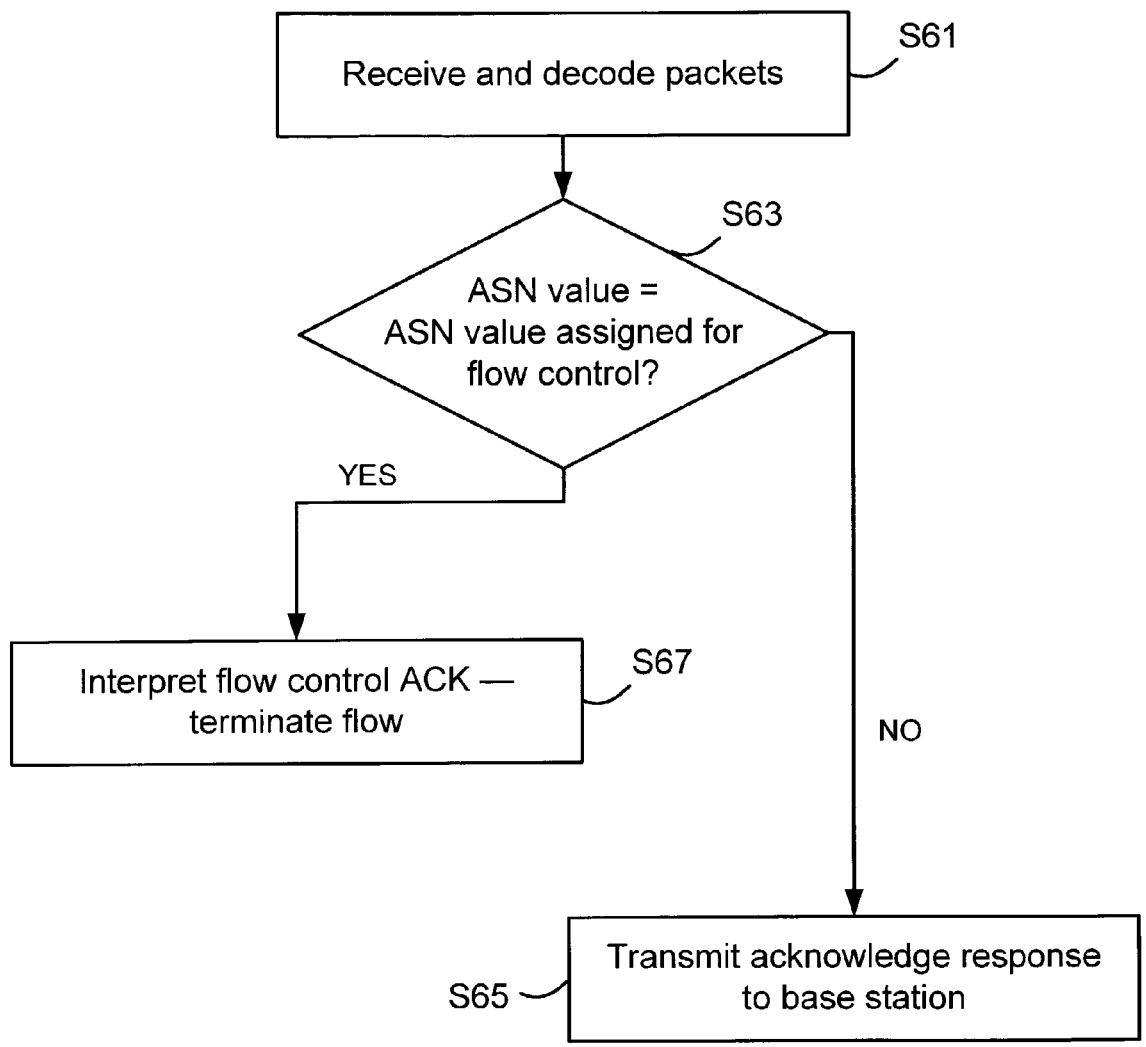
FIG. 6 illustrates the receiver-side functions based on the embodiment of FIG. 5.

FIG. 6 illustrates the receiving side functions in accordance with the embodiment of FIG. 5. FIG. 6 is somewhat similar to FIG. 4. At the UE 14, the data packets are received and a receiver 16 decodes (Step S61) the data packets, and outputs the data packets to a single buffer 23, which stores the data packets. The UE 14, upon receiving the MAC-hs PDU, will de-assemble the PDU to obtain the ASN value from the ASN field. If the ASN value is a valid transmission sequence number (e:g., with no flow control ACK message or NO at Step S 63), the transmission system 11' transmits an acknowledge response (Step S65) that identifies the received data packet by its PCI and TSN and indicates that the data packet has been received. If the ASN value is equal to the ASN value assigned for flow control (YES at Step S63), the UE 14 will interpret the ASN as a message that the flow indicated by the PCI will be controlled as requested by the UE in its flow control request. In this preferred embodiment, the flow to UE 14 is terminated (Step S67).

In each of the above embodiments, the flow control ACK message interpreted by UE 14 can contain several types of flow control responses. For example, the flow control ACK message could contain information indicating one of Stop, Hold, or Restart, or a combination of some or all of them. If the flow control ACK message indicates STOP, UE 14 receives information indicating that the flow control request has been received and that transmission for a particular flow (e.g., the requested flow) is being terminated. If the flow control ACK message indicates HOLD, UE 14 receives information indicating that the flow control request has been received, that UE 14 should continue to send flow control requests, and that data flow to UE 14 will remain active into the future. If the flow control ACK message indicates RESTART, UE 14 receives information indicating that the flow control request to restart data flow has been received by BS 10, and that the destination device is to resume receiving data flow from BS 10.

Accordingly the flow control acknowledgment implemented in the above embodiments use either a TSN space in the TSN field or the ASN field in a MAC-hs PDU packet to signal flow control acknowledgment message(s). Both of these embodiments utilize an in-band signaling method in the downlink as described above that exploits the advantages of in-band transmission enhancements, as briefly explained in the Description of Related Art that have been implemented for high speed downlink transmissions such as the HSDPA standard in UMTS.

The invention being thus described, it will be obvious that the same may be varied in many ways. For example, the logical blocks in FIG. 2 and flow diagram blocks in FIGS. 3-6 may be implemented in hardware and/or software. The hardware/software implementations may include a combination of processor(s) and article(s) of manufacture. The article(s) of manufacture may further include storage media, computer-readable media having code portions thereon that are read by a processor to perform the method, and executable computer program(s). The executable computer program(s) may include the instructions to perform the described operations in the method. The computer executable program(s) may also be provided as part of externally supplied propagated signal (s). Such variations are not to be regarded as departure from the spirit and scope of the invention, and all such modifications as would be obvious to one skilled in the art are intended to be included within the scope of the following claims.

We claim:

1. A method of transmitting data packets, comprising:
   transmitting a flow control request from a destination device;
   inserting a flow control acknowledgment, including a destination device flow control status indicator, for the destination device in a non-payload portion of a data packet responsive to the flow control request;
   generating an acknowledgment sequence number to be inserted in a portion of the data packet, the acknowledgment sequence number indicating a transmission sequence number of a data packet that has been received from the destination device,
   transmitting the data packet to the destination device with the flow control acknowledgment, the flow control acknowledgment being transmitted in response to the flow control request from the destination device wherein the flow control acknowledgment with a pre-allocated acknowledgment sequence number is inserted in place of the generated acknowledgment sequence number in said portion prior to said step of transmitting the data packet to the destination device.

2. An apparatus for transmitting data packets, comprising:
   an acknowledgment sequence number generator generating acknowledgment sequence numbers for data packets, the acknowledgment sequence number indicating a transmission sequence number of a data packet that has been received by a destination device and being allocated a space in each data packet, the acknowledgment sequence generator further inserting a flow control acknowledgment, including a destination device flow control status indicator, for the destination device in said allocated space of each of the data packets in place of said generated acknowledgment sequence number responsive to a flow control request received at the apparatus, the flow control acknowledgment indicating (1) that the flow control request has been received and that transmission for a particular flow is being terminated; (2) that the flow control request has been received, that the destination device should continue to send flow control requests, and that data flow to the destination device will remain active into the future; or (3) that a flow control request to restart data flow has been received and that the destination device is to resume receiving the data flow;
   a transmitter transmitting the data packets to a destination device, the flow control acknowledgment being transmitted in response to the flow control request from the destination device.

3. The apparatus of claim 2, wherein the destination device is a user equipment served by the apparatus in a High Speed Downlink Packet Access (HSDPA) specification of a Universal Mobile Telecommunication System (UMTS).

* * * * *